No. 739,941. Patented September 29, 1903.

UNITED STATES PATENT OFFICE.

CARL SPENGLER, OF DAVOS-PLATZ, SWITZERLAND.

PROCESS OF MANUFACTURING DISINFECTANTS.

SPECIFICATION forming part of Letters Patent No. 739,941, dated September 29, 1903.

Application filed March 19, 1901. Serial No. 51,917. (No specimens.)

*To all whom it may concern:*

Be it known that I, CARL SPENGLER, a citizen of Switzerland, residing at Davos-Platz, in the Republic of Switzerland, have invented a new and useful Process of Manufacturing a Disinfectant, of which the following is a specification.

A series of acids, especially organic acids, and other germicidal substances kill bacteria very easily if these substances are applied in the state of vapors and at higher temperatures than the usual temperature of rooms. Germacides vaporized or atomized either in the state of aqueous solutions or in the state of concentrated solutions are generally uncertain in their action, neither passing sufficiently low down in the respiratory organs nor penetrating deep enough into the tissues. To achieve in this case a fairly good germicidal action, it is necessary to use such large quantities of the antiseptic substances that the death of the bacteria in the superficial regions would be accompanied by the poisoning of the body and by the weakening of the natural forces protecting the body against infections.

The object of the present invention is to manufacture disinfectants which are applied after having been much diluted and if vaporized at higher temperatures than the usual temperature of rooms kill bacteria very easily without injuring the tissues of the body.

These disinfectants are manufactured in the following manner: Organic acids are dissolved in ethyl alcohol and then mixed with alcohol ether to formaldehyde. The alcohol ether acts as bearer of the disinfectant and causes the latter to reach without difficulty its point of destination. Besides alcohol ether I may also employ ether. Use may, for instance, be made of 0.0010 to 0.05 grams organic acids dissolved in ninety to one hundred cubic centimeters ethyl alcohol and added to 0.1 to 0.5 grams formaldehyde. The addition of the ethyl alcohol to the organic acids can be effected in such proportions that the various layers of the tissue, for instance, in the respiratory organs will be attacked nearly alike by the antiseptic. When formaldehyde is used alone, the action of this substance by itself is neither uniform nor reliable. Indeed its effect is directly poisonous, while by means of the addition of organic acids its action will be increased to such a considerable extent that the mixture thus formed kills even the most resistant kind of pathogenic bacteria, a temperature of over 25° being the most favorable for this purpose. The germicidal action is increased with regard to moist substrata of infections up to the temperature of the body of the warm-blooded animal to such an extraordinary degree that if to this mixture for disinfecting purposes alcohol ether or ether is added it may also be employed with excellent results for the respiratory organs without injuring at the same time the tissues of the body or the natural protective forces of the body. Ordinarily formaldehyde is not suitable for this purpose and is even dangerous.

What I claim as my invention, and desire to secure by Letters Patent, is—

The herein-described method of preparing a disinfecting agent suitable for internal use, which consists in adding ethyl alcohol to organic acids, and mixing this alcoholic solution with formaldehyde, substantially as described.

In testimony whereof I have signed my name to this specification in the presence of two subscribing witnesses.

CARL SPENGLER.

Witnesses:
A. LIEBERKNECHT,
RUDF. CEDAL.